(12) United States Patent
Kreysar et al.

(10) Patent No.: US 8,482,652 B2
(45) Date of Patent: Jul. 9, 2013

(54) IMAGING DEVICES WITH COMPONENTS FOR REFLECTING OPTICAL DATA AND ASSOCIATED METHODS OF USE AND MANUFACTURE

(75) Inventors: Douglas Kreysar, Redmond, WA (US); Ronald F. Rykowski, Bellevue, WA (US); Richard E. Albrecht, Cumming, GA (US)

(73) Assignee: Radiant Imaging, Inc., Redmond, WA (US)

( * ) Notice: Subject to any disclaimer, the term of this patent is extended or adjusted under 35 U.S.C. 154(b) by 313 days.

(21) Appl. No.: 12/748,035

(22) Filed: Mar. 26, 2010

(65) Prior Publication Data

US 2010/0245650 A1 Sep. 30, 2010

Related U.S. Application Data

(60) Provisional application No. 61/164,331, filed on Mar. 27, 2009.

(51) Int. Cl.
*H04N 5/217* (2006.01)
*H04N 5/238* (2006.01)

(52) U.S. Cl.
USPC ........ 348/335; 348/341; 348/367; 348/211.1; 359/290; 359/322

(58) Field of Classification Search
USPC ........................ 348/335, 341, 367–369, 211.1
See application file for complete search history.

(56) References Cited

U.S. PATENT DOCUMENTS

| | | | |
|---|---|---|---|
| 6,608,321 B1 * | 8/2003 | La Fontaine et al. | 250/559.44 |
| 6,856,720 B2 * | 2/2005 | Baugh | 385/22 |
| 7,280,735 B2 * | 10/2007 | Thibault | 385/147 |
| 2006/0050277 A1 * | 3/2006 | Ok et al. | 356/417 |
| 2006/0203100 A1 * | 9/2006 | Ajito et al. | 348/220.1 |
| 2007/0081086 A1 * | 4/2007 | Ingram | 348/262 |
| 2007/0081252 A1 * | 4/2007 | Lin et al. | 359/618 |
| 2007/0177049 A1 * | 8/2007 | Kreysar et al. | 348/368 |
| 2007/0229683 A1 * | 10/2007 | Larson et al. | 348/269 |
| 2008/0088918 A1 * | 4/2008 | O'Connell | 359/371 |
| 2009/0303335 A1 * | 12/2009 | Stueckler | 348/222.1 |

* cited by examiner

*Primary Examiner* — Hung Lam
(74) *Attorney, Agent, or Firm* — Perkins Coie LLP

(57) ABSTRACT

The present disclosure is directed to imaging device, systems, and methods for collecting optical data for use with spectrometers. An imaging device configured in accordance with one aspect of the disclosure includes a lens configured to introduce light into the imaging device along an optical path, and an image sensor spaced apart from the lens and configured to receive at least a portion of the light along the optical path. The imaging device further includes a filter assembly positioned between the lens and the image sensor, and a reflector or mirror carried by the filter assembly. The filter assembly is configured to move the reflector between first and second positions. In the first position the reflector is at least partially aligned with the optical path and reflects at least a portion of the light to a corresponding light input for a spectrometer. In the second position the reflector is positioned outside of the optical path.

23 Claims, 10 Drawing Sheets

IMAGING DEVICES WITH COMPONENTS FOR REFLECTING OPTICAL DATA AND ASSOCIATED METHODS OF USE AND MANUFACTURE

CROSS-REFERENCE TO RELATED APPLICATION(S)

The present disclosure claims priority to and incorporates by reference in its entirety U.S. Provisional Application No. 61/164,331, entitled "OPTICAL PICKOFFS WITHIN CAMERAS FOR SPECTROMETER MEASUREMENTS AND ASSOCIATED METHODS AND SYSTEMS," filed Mar. 27, 2009.

TECHNICAL FIELD

The present disclosure relates generally to systems and methods for acquiring optical data and, more particularly, to imaging devices including integral optical components for acquiring optical data to be supplied to a spectrometer.

BACKGROUND

Cameras capture light properties from a light source. For example, digital cameras capture or measure the color distribution of a light source. The accuracy of such cameras, however, can be improved by comparing or otherwise calibrating a camera's measured light with a spectrometer's measured light from the same light source. A spectrometer is an instrument used to measure properties of light over a specific portion of the electromagnetic spectrum. FIGS. 1A and 1B are schematic partial illustrations of a conventional system 100 for collecting light within a camera. Referring to FIGS. 1A and 1B together, the light passes through a lens assembly or imaging lens 102, and the system 100 sends the light to an optical or spectrometer fiber optic input 104. The optical fiber 104 in turn transmits the light to a spectrometer (not shown). In the system 100 of FIGS. 1A and 1B, a mirror 106 is mounted to a pivoting arm 108 to selectively intercept a light path. In FIG. 1A, for example, the mirror 106 is positioned so that it reflects light into the optical fiber 104. In this position however, light is blocked from reaching an image sensor 110 (e.g., CCD). By pivoting the arm out of the light path 112 as shown in FIG. 1B, the light path 112 is now unobstructed and the CCD 110 can collect the full image. As shown in FIGS. 1A and 1B, the input end of the optical fiber 104 is near the focal plane of the imaging lens 102. This means that the sample area is only as large as the input aperture of the optical fiber 104. Depending on the type of fiber used, this arrangement may sample only a small area of the image that the CCD 110 can capture.

In some applications, the mirror 106 can be replaced with a beamsplitter (not shown) configured to allow spectrometer samples to be collected at the same time as the CCD 110 collects the image. A beamsplitter can therefore eliminate the need to move the mirror 106 when the CCD 110 is used, however this can also result in a reduction of the total light that reaches the optical input 104 and the CCD 110. A beamsplitter may still be an advantage over the arrangement shown in FIGS. 1A and 1B, however, if the application needs to record spectrometer data at the same time as the CCD image is captured.

FIG. 2 is a schematic partial illustration of another conventional system 200 for collecting light from a full image field. More specifically, the system 200 of FIG. 2 illustrates an arrangement for sampling the full image field even if an input aperture 105 of the optical fiber 104 is smaller than the field of view. In this case, a field lens 202 is placed near an image plane 204 and gathers the light from the lens assembly or image lens 102 and mirror 206 to focus the light onto the input aperture 105 of the optical fiber 104. Similar to the system described above with reference to FIGS. 1A and 1B, the mirror 206 is mounted on a pivoting arm 208. A mask (not shown) can be positioned near the field lens 202 to specifically define the area that the spectrometer samples.

DETAILED DESCRIPTION

A. Overview

Figure 1:
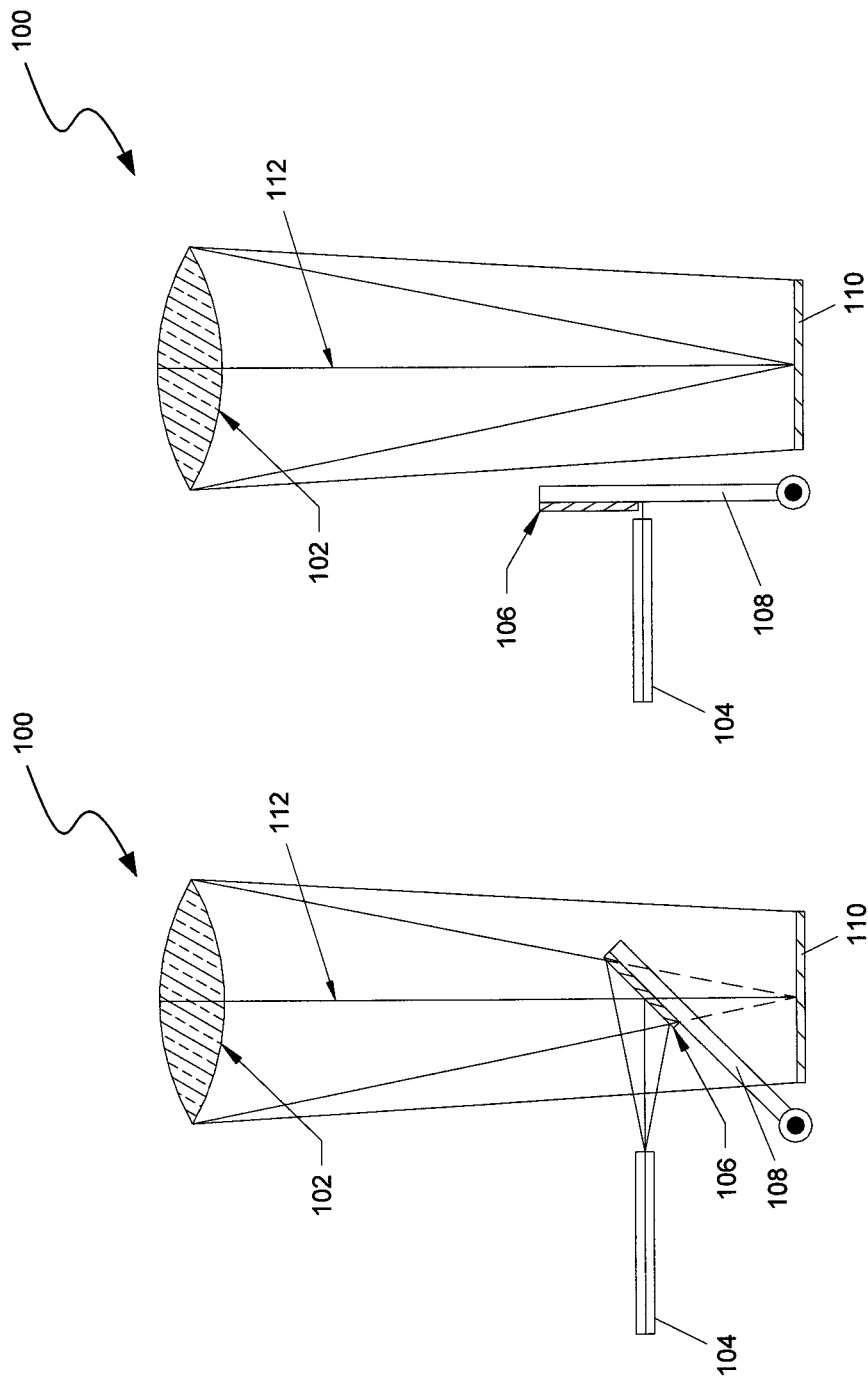
FIGS. 1A and 1B are schematic partial illustrations of a conventional system for collecting light and sending it to an optical fiber in accordance with the prior art.

The present disclosure describes optical pickoffs or reflecting subassemblies positioned within imaging devices for spectrometer measurements and associated methods and systems. For example, cameras having optical components arranged in such a way to combine a spectrometer measurement with a charge-coupled device (CCD) image are described in detail below. For example, an imaging device configured in accordance with one aspect of the disclosure includes a lens configured to introduce light into the imaging device along an optical path, and an image sensor spaced apart from the lens and configured to receive at least a portion of the light along the optical path. The imaging device further includes a filter assembly positioned between the lens and the image sensor, and a reflector or mirror carried by the filter assembly. The filter assembly is configured to move the reflector between first and second positions. In the first position the reflector is at least partially aligned with the optical path and reflects at least a portion of the light to a corresponding light input for a spectrometer. In the second position the reflector is positioned outside of the optical path.

Certain details are set forth in the following description and in FIGS. 3-11 to provide a thorough understanding of various embodiments of the disclosure. However, other details describing well-known structures and systems often associated with imaging devices and related optical equipment are not set forth below to avoid unnecessarily obscuring the description of various embodiments of the disclosure.

Many of the details, dimensions, angles, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Where the context permits, singular or plural terms may also include plural or singular terms, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

B. Embodiments of Imaging Devices Including Optical Components Configured to Acquire Optical Data for Spectrometers and Associated Methods and Systems Digital cameras often use a multiple color filter technique to measure the general color distribution of a light source or light reflected from an object. While these measurements are captured relatively quickly, the accuracy of these measurements can be improved by comparing or calibrating the measurements with spectrometer measurements that measure specific regions of the light spectrum very accurately. For example, when using a digital camera (e.g., an imaging colorimeter) to provide absolute scientific color measurements, it is relatively common to compare or calibrate the imaging colorimeter with a spectrometer. However, imaging devices, such as digital cameras including CCD image sensors that use color filters do not generally provide spectral data (power vs. wavelength). In addition to calibrating an imaging device, the spectral data of a light source can also be valuable for several other reasons. For example, the spectral data can be used to calculate a Color Rendering Index, or CRI, of a light source, which may be valuable for several different applications. Conventional filter based CCD imaging devices, however, cannot calculate CRI.

This process of obtaining spectral data is typically accomplished with the spectrometer totally separate from the imaging colorimeter or imaging device, and with a separate optical system for the spectrometer. However, when comparing or calibrating an imaging device, it is advantageous to measure the same area with both instruments. It is also generally preferred to measure the same image produced by the camera lens because this reduces the number of variables that can introduce errors between the two measurements. In most cases, there is limited room behind the camera lens to introduce the necessary optics to collect measurements with both the camera imaging device (like a CCD) and the spectrometer sensor. Embodiments of the present disclosure solve this problem by adding optical components that use the existing space and mechanisms in the camera between the lens and the image plane.

Figure 2:
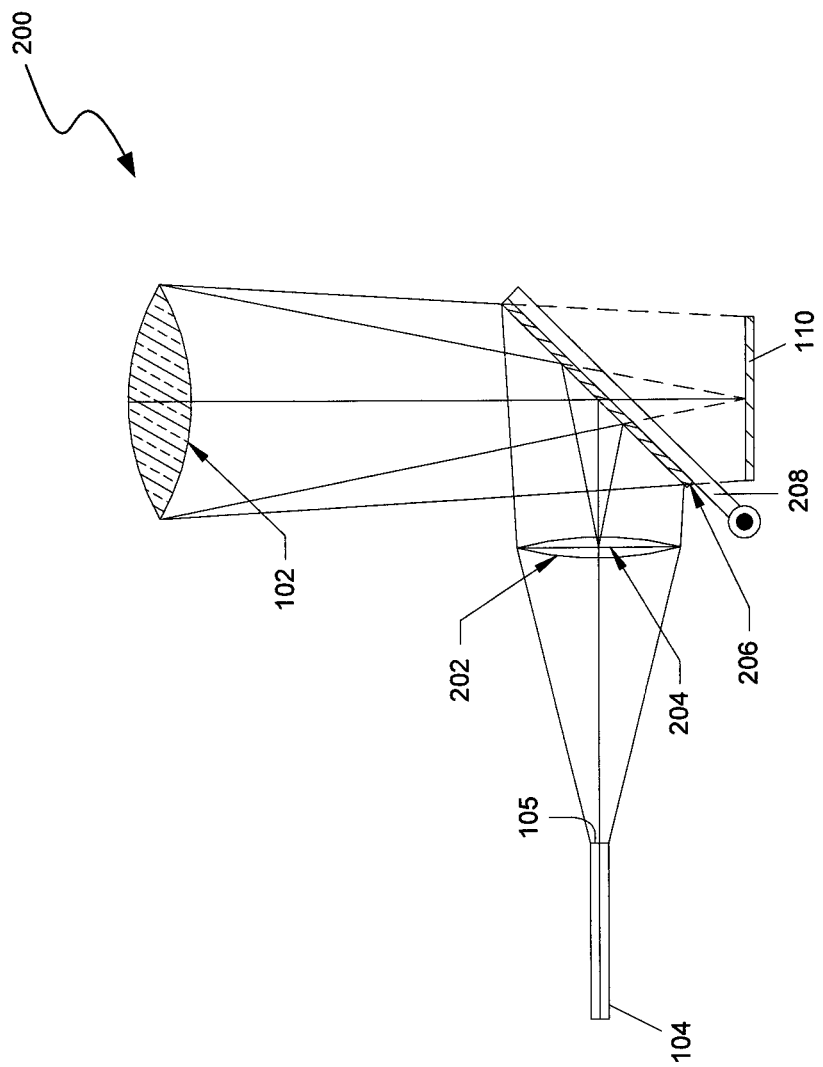
FIG. 2 is a schematic partial illustration of another conventional system for collecting light from a full image field in accordance with the prior art.
Figure 3:
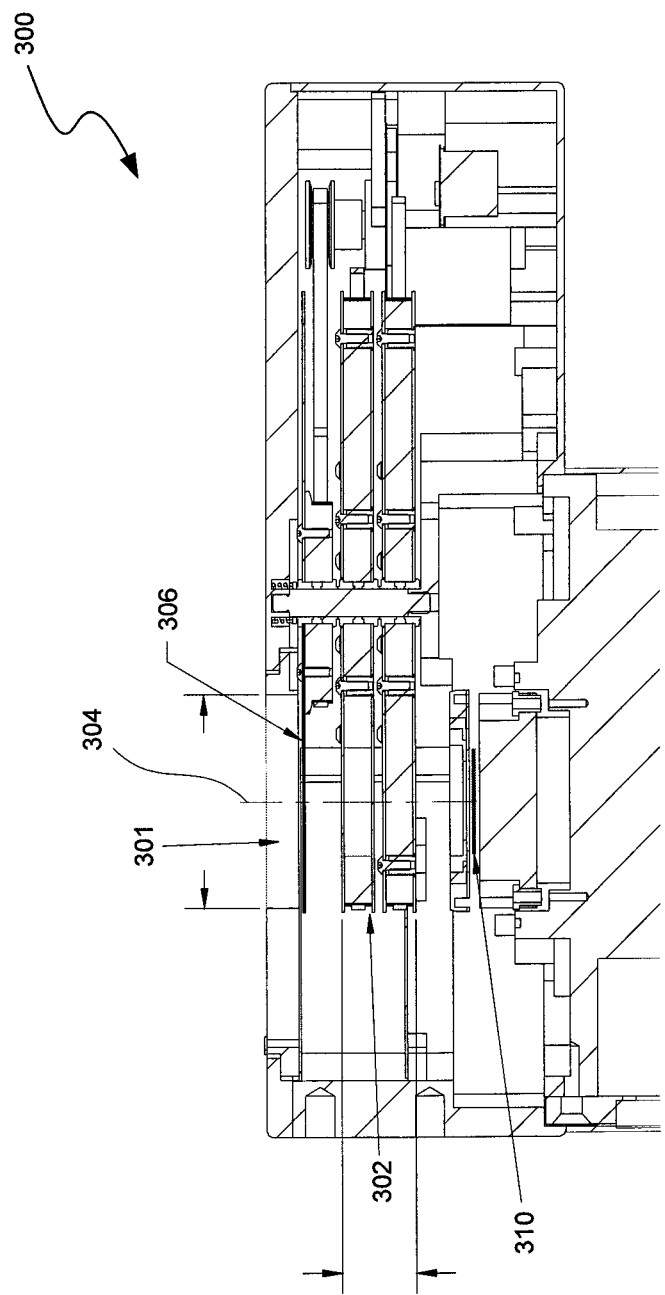
FIG. 3 is a schematic cross-sectional illustration of a portion of a digital camera.

The conventional arrangements described above with reference to FIGS. 1A-2 generally require a significant portion of the optical path for the placement of the mirrors and/or beamsplitters. Many digital cameras, however, have limited space between the image lens and the CCD image plane. Moreover, this space often has a number of other items that also need room to perform a particular function during camera operations. FIG. 3, for example, is a schematic cross-sectional illustration of a portion of an imaging device 300 (e.g., a digital camera, imaging colorimeter, or other type of imaging device). The camera 300 includes a lens 301 and one or more filter wheels 302 configured to hold multiple filters and position these filters in an optical path 304 between the lens 301 and an image sensor 310 (e.g., CCD). More specifically, each filter wheel 302 has a rotational axis that is generally parallel to the optical path 304. As such, each filter wheel 302 can rotate about its corresponding rotational axis to move the desired filter into the optical path 301. In addition to the filter wheels 302, a shutter 306 can be positioned within or proximate to this same area within the camera 300. As such, there is generally very limited space within the camera 300. As described in detail below, however, one advantage of the present disclosure is that the systems configured in accordance with embodiments of the disclosure are configured with components that can collect light for a spectrometer (not shown) within the minimal amount of space proximate to the optical path 304.

Figure 4:
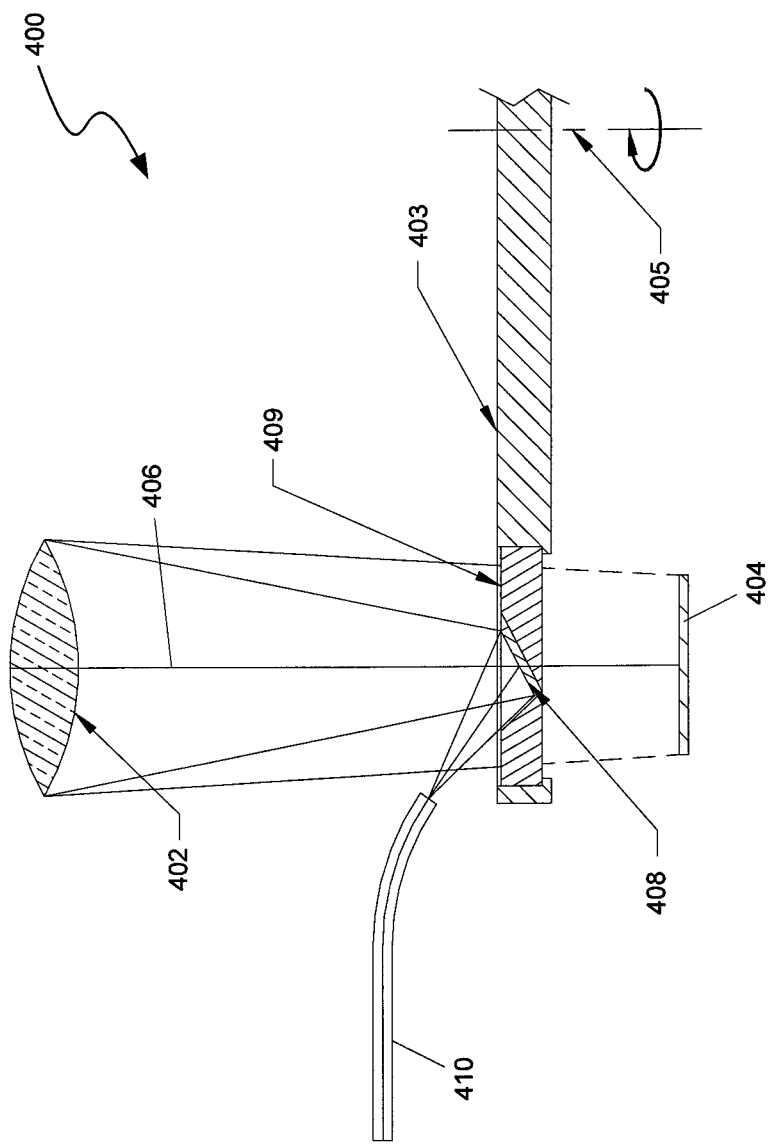
FIG. 4 is a schematic partial illustration of an in-camera optical pickoff system for spectrometer measurements configured in accordance with an embodiment of the disclosure.

FIG. 4, for example, is a schematic partial illustration of an in-camera optical pickoff system 400 configured in accordance with an embodiment of the disclosure for reflecting light for spectrometer measurements. In the illustrated embodiment, the system 400 includes a camera (e.g., an imaging colorimeter) having a lens assembly or image lens 402 and image sensor 404 (e.g., a CCD) positioned along an optical axis or path 406. The system 400 also includes a filter wheel 403 carrying one or more filters. The filter wheel 403 rotates about a rotational axis 405 that is generally parallel to the optical path 406.

According to one feature of the embodiment shown in FIG. 4, the filter wheel 403 carries a mirror 408. More specifically, the mirror 408 is positioned in a mirror support 409 that is mounted on the filter wheel 403 in the space typically reserved for a filter. The filter wheel 403 moves the mirror 408 to reflect or otherwise direct at least a portion of the light toward an optical input, such as an optical fiber input 410. In other embodiments, however, the optical input can be a rigid optical input, such as a light pipe. This configuration saves space because the mirror 408 is carried by an existing mechanism (e.g., a filter wheel 403) of the camera that moves the mirror 408 in and out of the optical axis or light path 406. For example, the mirror 408 is mounted in a volume or area that is typically shared with other filters already used by the camera. The mirror 408 and/or the mirror support 409, for example, can be generally the same size as a typical filter so that they fit within the filter wheel 403. More specifically, the mirror 408 and mirror support 409 can fit within the thickness of the filter wheel 403.

The arrangement of the embodiment shown in FIG. 4 provides a small spot sample for the spectrometer (e.g., corresponding to the size of an aperture of the optical input 410). Sampling a small spot is expected to help keep the optical components small and, accordingly make it easier to find mounting space within the camera. Depending on the internal design of the camera, however, and as described in detail below, one or more additional mirrors may be used to route the reflected light in the available space.

Figure 5:
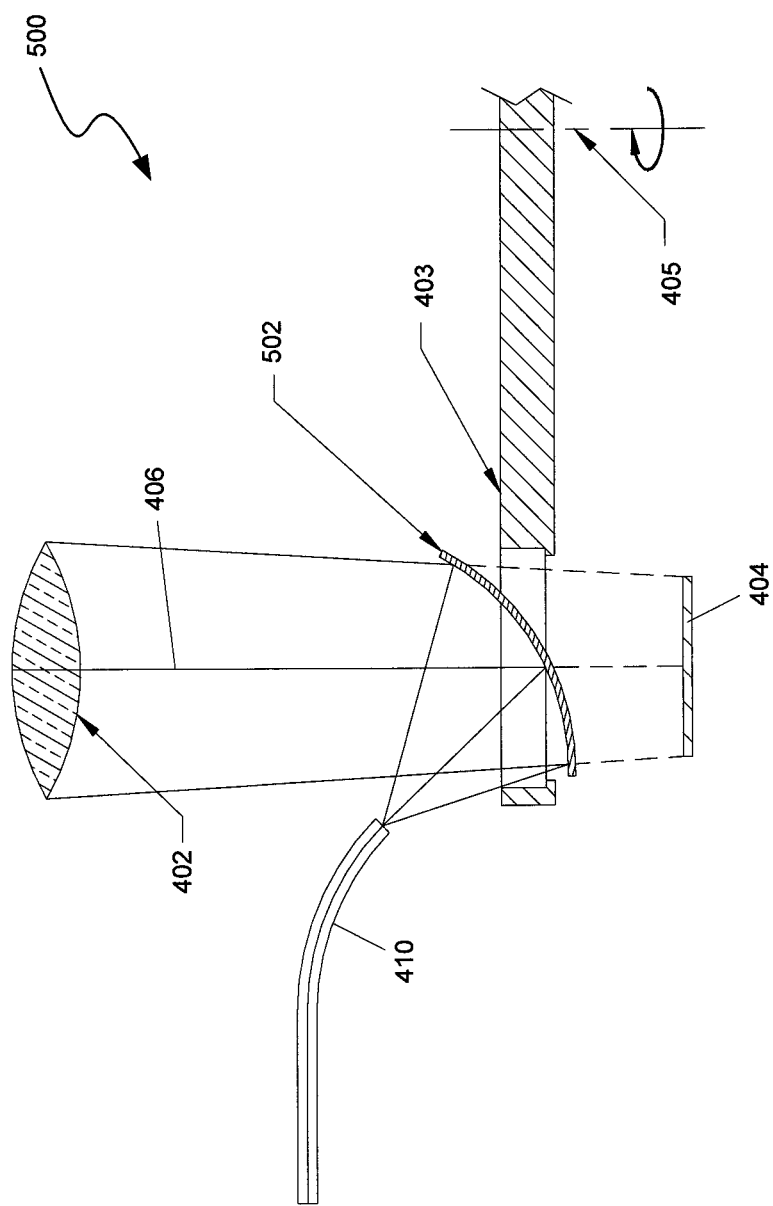
FIG. 5 is a schematic partial illustration of an in-camera optical pickoff system for spectrometer measurements configured in accordance with another embodiment of the disclosure.

While measuring the spectrum of a small spot is useful, there may also be applications that require a larger sample spot that approaches the size of the full camera image area. FIG. 5, for example, is a schematic partial illustration of an in-camera optical pickoff system 500 configured in accordance with another embodiment of the disclosure for collecting light for spectrometer measurements. In the embodiment shown in FIG. 5, one or more portions of a mirror 502 (e.g., an off-axis mirror) can be used to collect light from a relatively large area of the image and direct it to the optical input 410. In the embodiment illustrated in FIG. 5, the mirror 502 extends beyond a thickness of the filter wheel 403. This embodiment uses the mirror 502 for two purposes. For example, in addition to reflecting the sample light toward the optical input 410, the mirror 502 also provides a function similar to the field lens described above with reference to FIG. 2. Although the arrangement of FIG. 5 is suitable for many applications requiring larger sample spot, the size of the mirror 502 may be larger than the space within the camera for the filters. Accordingly, this arrangement is generally more suitable for cameras that have room for such a relatively large mirror 502.

Figure 6:
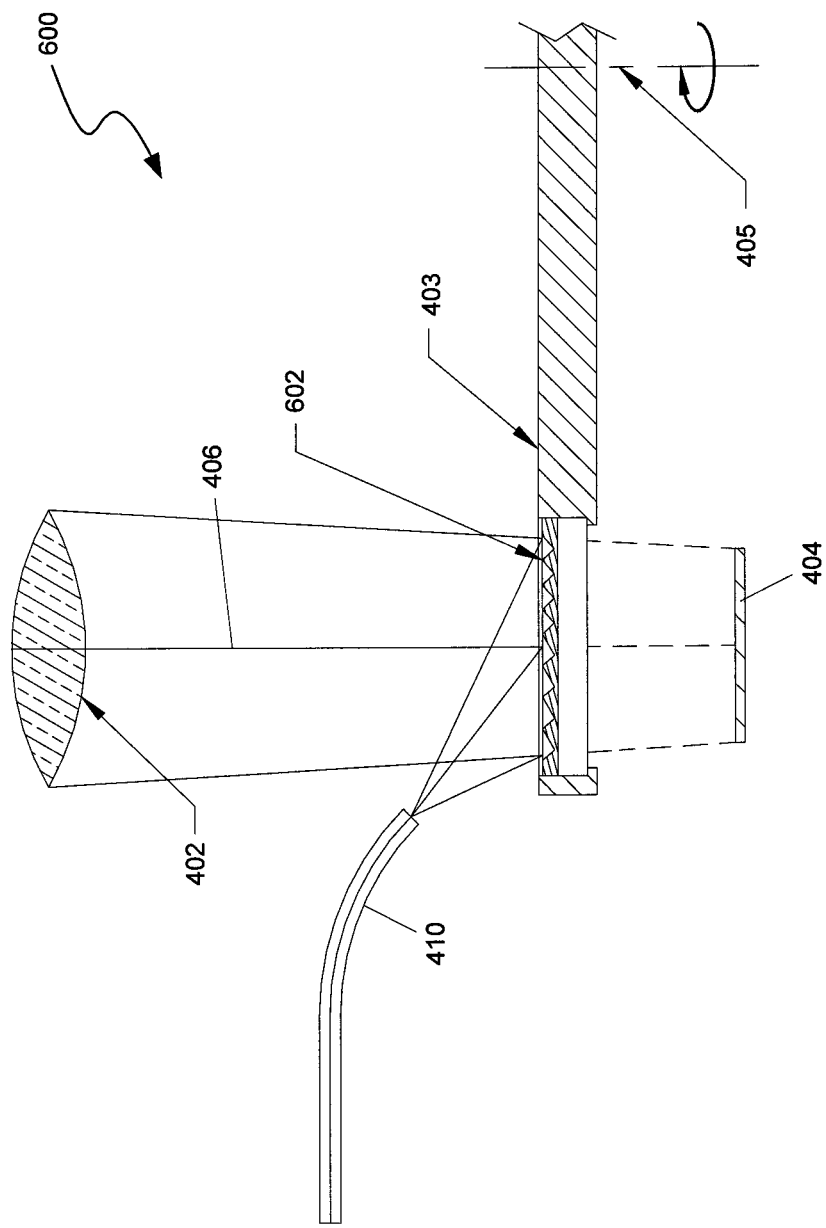
FIG. 6 is a schematic partial illustration of an in-camera optical pickoff system for spectrometer measurements configured in accordance with still another embodiment of the disclosure.

FIG. 6 is a schematic partial illustration of an in-camera optical pickoff system 600 for spectrometer measurements configured in accordance with still another embodiment of the disclosure. The system of FIG. 6 can include many of the same features and advantages as the systems described above. The embodiment shown in FIG. 6 differs from those described above, however, in that a Fresnel mirror 602 is used instead of a continuous surface mirror (such as the mirror shown in FIG. 4). One advantage of the Fresnel mirror 602 is that it is expected to have a smaller form factor than the continuous surface mirror and, accordingly, take up less space within the camera. Although the Fresnel mirror 602 is not in an image plane, the Fresnel mirror 602 is configured to perform the function of a field lens. In addition, the embodiment illustrated in FIG. 6 may be particularly suitable for applications when there is no high quality image requirement in sending light into the fiber optic input 410. Such applications can allow for more tolerance in fabricating and positioning the Fresnel mirror 602.

In still other embodiments, another approach to providing sample light to the spectrometer optic input 410 is to use a reflector that is a diffuser, such as a neutral diffuse surface in lieu of the Fresnel mirror 602 shown in FIG. 6 to scatter the light into the optical input 410. In one embodiment, for example, the diffuser can be a neutral diffuse surface that includes flat white paint on a disk positioned in the filter holder at the same location where the Fresnel mirror 602 was located. In another embodiment, the diffuser can be a diffuse surface that includes a ground surface on a disk that is aluminized. In some instances, the aluminized surface may be more efficient than a white painted surface. In still other embodiments, the neutral diffuse surface can include other features and/or have a different arrangement. Although these alternative arrangements may be not as efficient as the Fresnel mirror 602 described above with reference to FIG. 6, such arrangements may be useful in instances where the expected light levels are sufficient. Moreover, in some instances these alternative arrangements may be simpler and less expensive than systems including a Fresnel mirror.

Figure 7A:
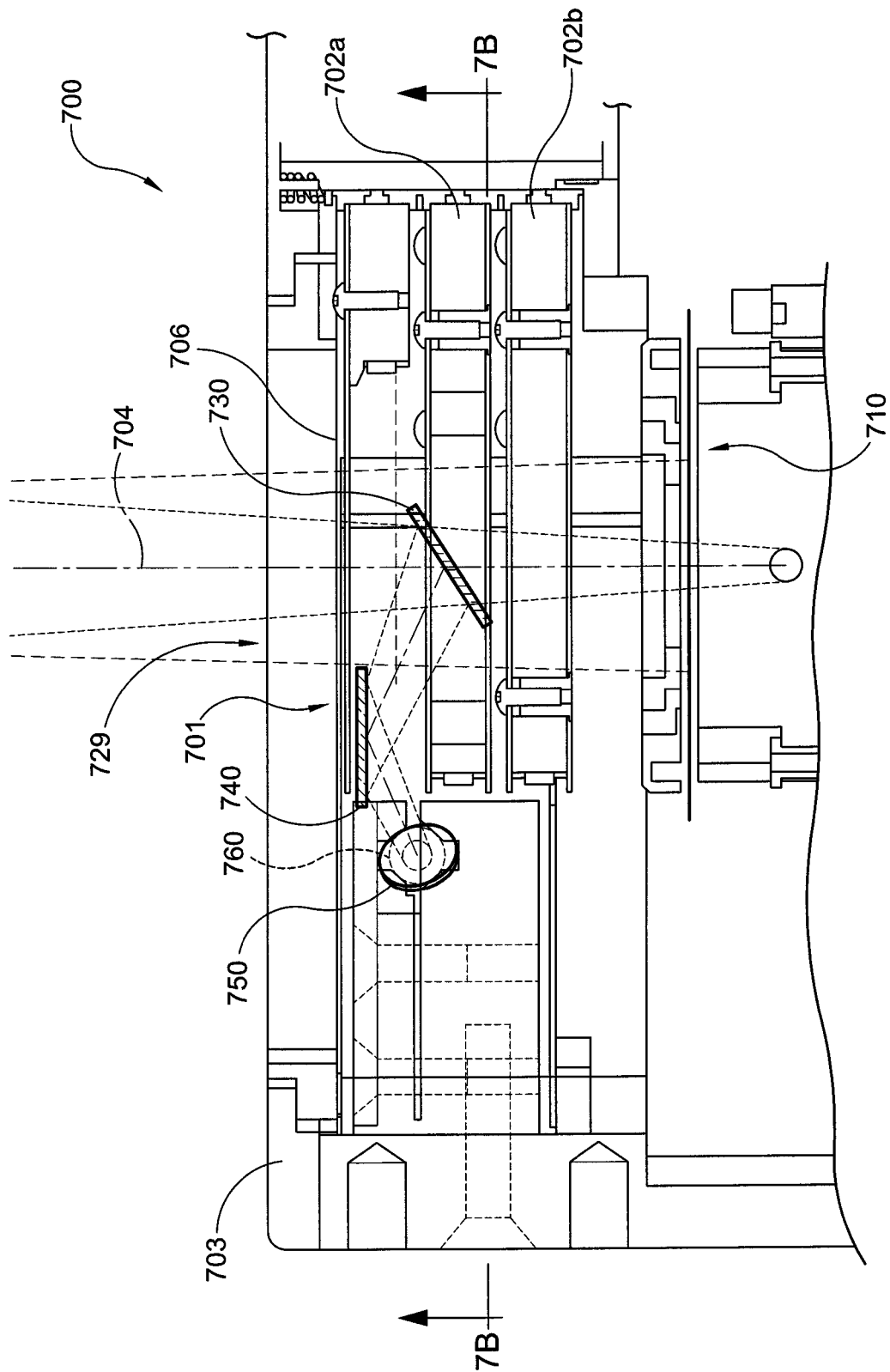
FIG. 7A is a schematic cross-sectional side view of a portion of a camera configured in accordance with yet another embodiment of the disclosure.

FIG. 7A is a schematic cross-sectional side view of a portion of an imaging device 700 (e.g., a digital camera such as an imaging colorimeter or the like) configured in accordance with yet another embodiment of the disclosure. The imaging device 700 includes several features that are generally similar in structure and function to the corresponding features of the imaging devices described above. For example, the imaging device 700 illustrated in FIG. 7A includes a body or housing 703 carrying a shutter 706 adjacent to a lens 701. The imaging device 700 also includes one or more filter wheels 702 (identified individually as a first filter wheel 702a and a second filter wheel 702b) positioned in an optical path 704 between the lens 301 and an image sensor 710 (e.g., a CCD). The filter wheels 702 are configured to rotate about a corresponding rotational axis that is generally parallel to the optical path 704 to move various filters into the optical path 704.

In the illustrated embodiment, the imaging device 700 also includes a pickoff system or subassembly 729 configured to collect or gather light in the imaging device 700 between the lens 701 and the image sensor 710, and redirect or otherwise transmit the collected light to a spectrometer (not shown in FIG. 7A). More specifically, the subassembly 700 includes a plurality of reflectors or mirrors that intercept the light and reflect the light to an optical input, such as a light pipe or fiber optic component that can be coupled to a spectrometer. For example, the subassembly 729 includes a first reflector or mirror 730 (e.g., a "pickoff" mirror) that is mounted in one of the filter positions in the first filter wheel 702a. Although the first filter wheel 702a carries the first mirror 730 in the illustrated embodiment, in other embodiments the second filter wheel 7022b can carry the first mirror. In either case, the first mirror 730 is configured to be selectively positioned in the optical path 704 to reflect the image light to a second reflector or mirror 740. For example, the first filter wheel 702a rotates to position the first mirror 730 in the optical path 704. In the illustrated embodiment, the second mirror 740 is positioned adjacent to the shutter 706 but outside of the optical path 704. The second mirror 740 directs the light to a third reflector or mirror 750, which in turn directs the light to an optical input or light collector, such as a light pipe 760. As described in detail below, the light pipe 760 is configured to be coupled to spectrometer to analyze the image data reflected by the pickoff system 729. Although the illustrated embodiment includes three mirrors or reflectors, in other embodiments, the imaging device 700 and other imaging devices described herein can include more or less than three mirrors or reflectors, including, for example, one, two, four, or more mirrors or reflectors.

Figure 7B:
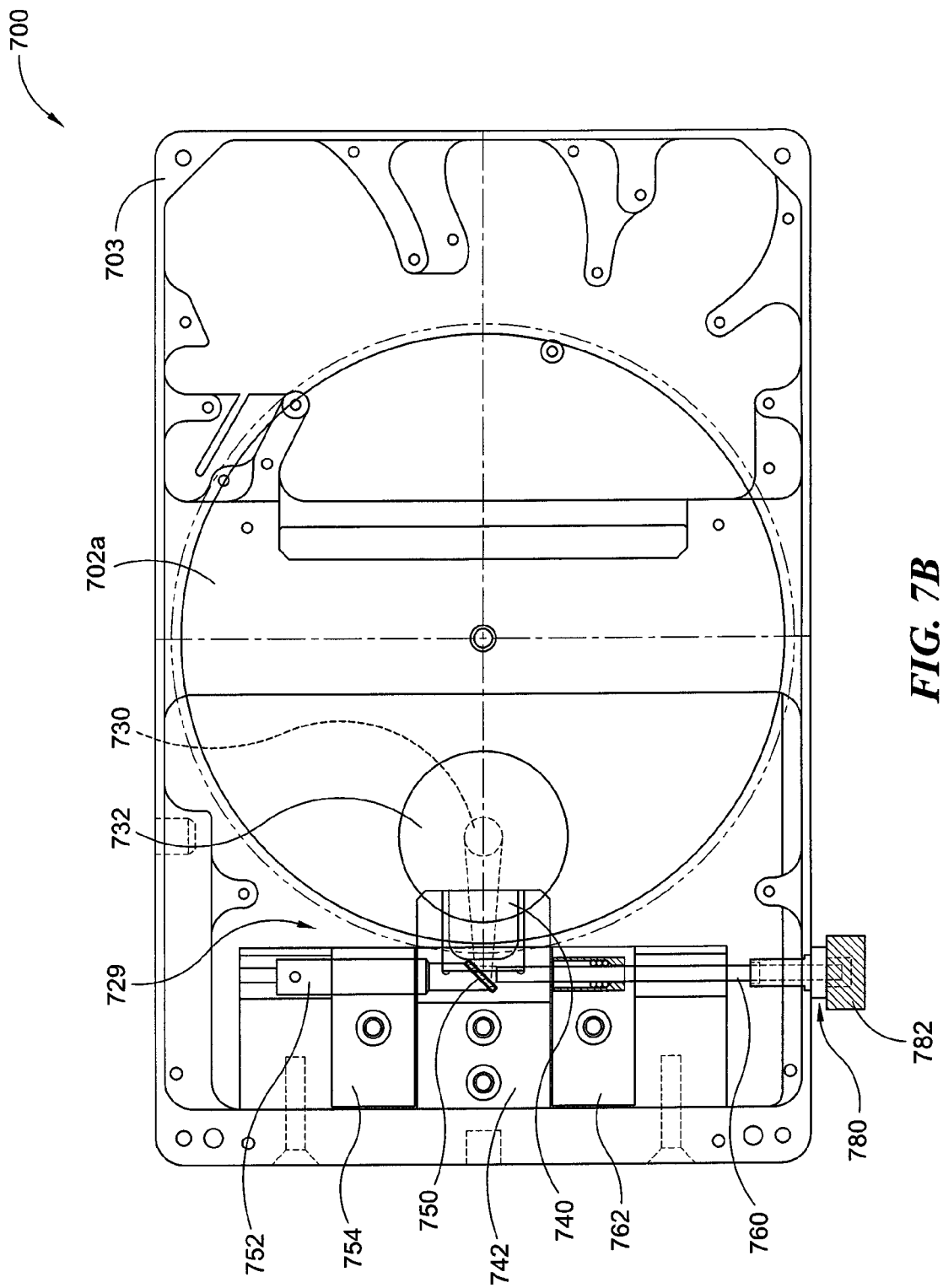
FIG. 7B is a schematic wire frame top view of a portion of the camera of FIG. 7A taken substantially along the line 7B-7B of FIG. 7A.

FIG. 7B is a schematic wire frame top view of a portion of the imaging device 700 of FIG. 7A taken substantially along the line 7B-7B of FIG. 7A. As shown in FIG. 7B, the subassembly 729 further includes a first mirror support 732 that adjustably secures the first mirror 730 in the first color wheel 702a. The subassembly 729 also includes a second mirror support 742 that retains the second mirror 740 on the body 703, and an adjustable third mirror support 752 that carries the third mirror 750 adjacent to an end portion of the light pipe 760. The subassembly 729 further includes a third mirror securing member or clamp 754 that secures the third mirror support 752 relative to the body 703, as well as a light pipe securing member or clamp 762 that secures the light pipe 760 relative to the body 703.

According to yet another feature of the illustrated embodiment, the imaging device further includes a coupling 780, such as a fiber optic coupling or link, that provides a connection between the light pipe 760 and a spectrometer 782

(shown schematically). In the illustrated embodiment, the spectrometer 782 is separate from the imaging device 700. In other embodiments, however, the spectrometer 782 can be integral with the imaging device 700.

With reference to FIGS. 7A and 7B, and similar to the embodiments described above, the imaging device 700 is configured to selectively redirect the light collected by the lens 701 to the spectrometer 782 in addition to allowing light to pass from the lens 701 to the imaging sensor 710. Accordingly, the imaging device 700 of the illustrated embodiment can quickly and accurately supply light from the lens 701 to both the imaging sensor 710 as well as the spectrometer 782. For example, the imaging device 700, as well as other imaging devices described herein, can operate in a first mode or picture taking mode when passing light from the lens 701 to the imaging sensor 710. However, the imaging device 700, as well as other imaging devices described herein, can also operate in a light reflecting mode when reflecting light from the one or more reflectors to the optical input. Further details regarding the components of the light pickoff subassembly 729 are described in detail below with reference to FIGS. 8A-11B.

Figure 8A:
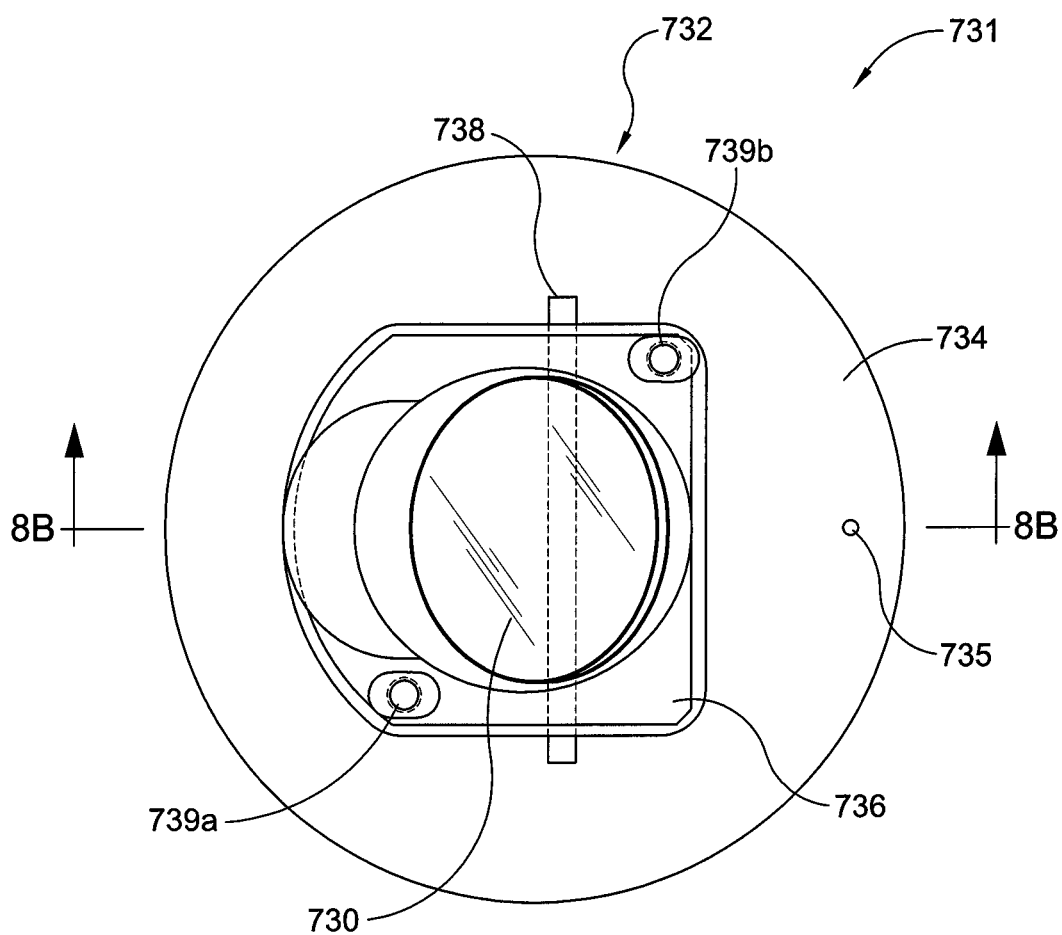
FIG. 8A is a top view of a first mirror subassembly configured in accordance with an embodiment of the disclosure.
Figure 8B:
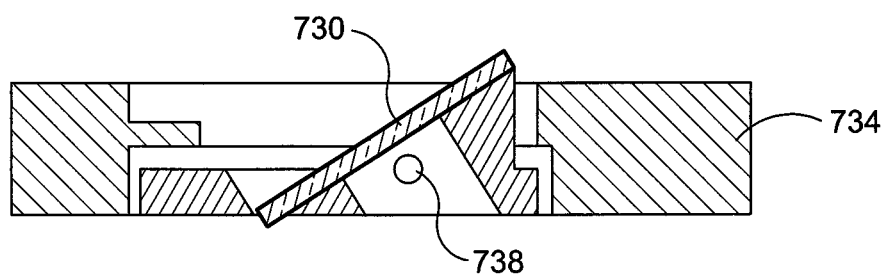
FIG. 8B is a cross-sectional side view of the first mirror subassembly of FIG. 8A taken substantially along the line 8B-8B of FIG. 8A.

FIG. 8A is a top view of a first mirror subassembly 731 configured in accordance with an embodiment of the disclosure, and FIG. 8B is a cross-sectional side view of the first mirror subassembly 731 of FIG. 8A taken substantially along the line 8B-8B of FIG. 8A. Referring to FIGS. 8A and 8B together, the first mirror subassembly 731 includes several components that adjustably secure the first mirror 730 to the first filter wheel 702*a* (FIGS. 7A and 7B). More specifically, the first mirror subassembly 731 includes a base 734. In the illustrated embodiment, the base 734 includes a corresponding position reference indicator 735 to illustrate the relative position of the first mirror subassembly 731 in the filter wheel 702*a*. The base 734 can be configured to be approximately the same size as a filter that would normally be positioned in the corresponding filter wheel in the place of the first mirror subassembly 731.

The first mirror subassembly 731 further includes a first mirror support 736 attached (e.g., adhered) to the first mirror 730. A connector or pin 738 pivotally couples the first mirror support 736 to the base 734. As such, the first mirror support 736 and first mirror 730 can pivot about the pin 738 to adjust the angle of the first mirror 730. The subassembly 731 also includes adjustment members 739 (identified individually as a first adjustment member 739*a* and a second adjustment member 739*b*) that are configured to adjust and/or secure the tilt or angle of the first mirror 730 relative to the base. For example, in certain embodiments, the adjustment members 739 can be screws or bolts that threadably engage and extend through the first mirror support 736 to contact the base to adjust and/or secure the pivotal position of the first mirror support 736 relative to the base.

Figure 9:
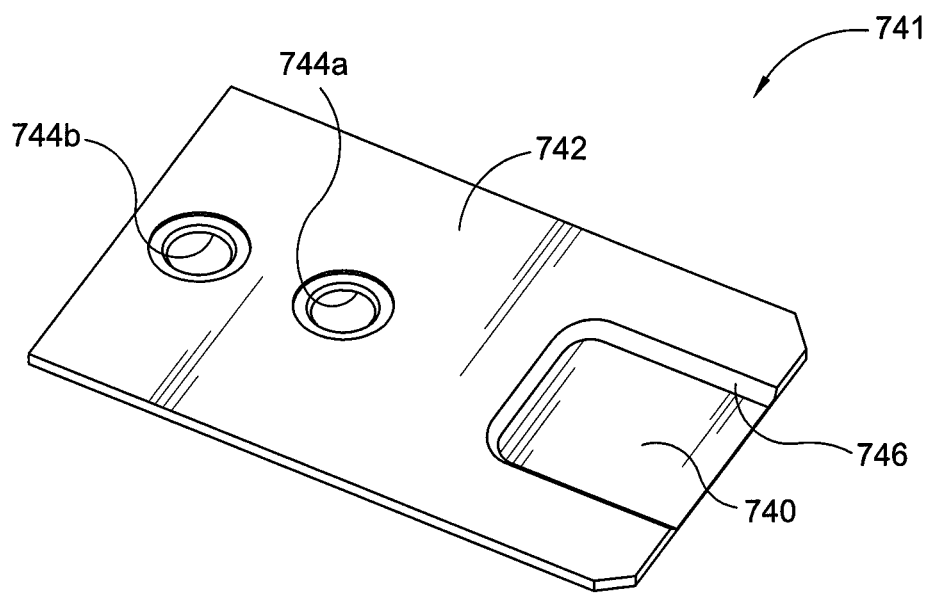
FIG. 9 is an isometric side view of a second mirror assembly configured in accordance with an embodiment of the disclosure.

FIG. 9 is an isometric side view of a second mirror assembly 741 configured in accordance with an embodiment of the disclosure. The second mirror assembly 741 includes a second mirror support 742 that carries the second mirror 740. The second mirror support 742 includes a recessed attachment zone 746 that receives the second mirror 740. In certain embodiments, the second mirror 740 can be adhered or otherwise attached to the second mirror 742 with an adhesive, such as an epoxy. The second mirror support 742 also includes multiple attachment openings 744 (identified individually as a first attachment opening 744*a* and a second attachment opening 744*b*) configured to receive fasteners to couple the second mirror support 742 to the body 703 of the imaging device 700 (FIGS. 7A and 7B).

Figure 10:
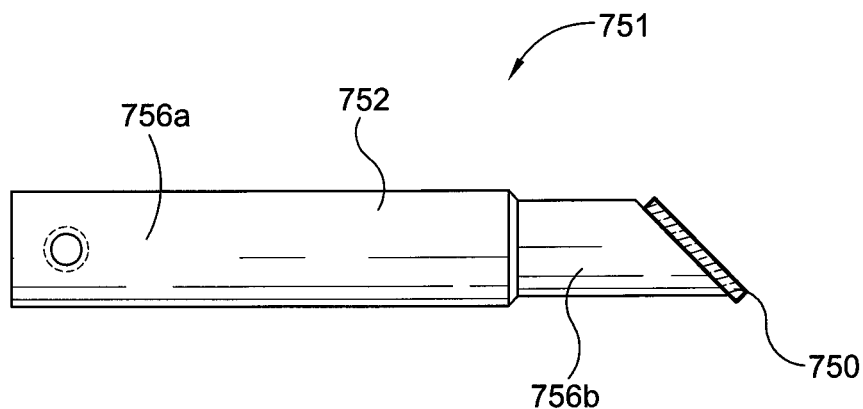
FIG. 10 is a side view of a third mirror assembly configured in accordance with an embodiment of the disclosure.

FIG. 10 is a side view of a third mirror assembly 751 configured in accordance with an embodiment of the disclosure. The third mirror assembly 751 includes a third mirror support 752 that carries the third mirror 750. In the illustrated embodiment, the third mirror 750 has a generally circular shape and the third mirror support 752 has a generally cylindrical or tubular shaped body. The third mirror support 752 has a first end portion 756*a* opposite a second end portion 756*b*. The third mirror 750 can be adhered or otherwise attached to the second end portion 756*b* of the third mirror support 752 with an adhesive, such as an epoxy. Moreover, the first end portion 756*a* of the third mirror support 752 is configured to be secured to the body 703 of the imaging device 700 by the second mirror clamp 754 (FIG. 7B). Accordingly, a user can easily adjust the spacing of the third mirror 750 relative to the light pipe 760. For example, the third mirror support 752 can be positioned to place the third mirror 750 adjacent to the end portion of the light pipe 760. Moreover, the tubular shape of the third mirror support 752 provides for easy rotational adjustment of the third mirror 750 relative to the light pipe 760.

Figure 11:
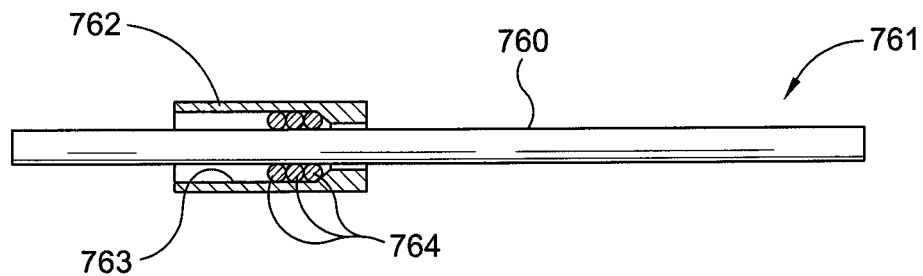
FIG. 11 is a cross-sectional side view of a light pipe assembly configured in accordance with an embodiment of the disclosure.

FIG. 11 is a cross-sectional side view of a light pipe assembly 761 configured in accordance with an embodiment of the disclosure. The light pipe assembly 761 includes a light pipe support 762 that carries the light pipe 760. More specifically, the light pipe support 762 includes a cavity 763 that receives a plurality of support members 764 positioned around the light pipe 760. In certain embodiments, for example, the support members 764 can be o-rings that securely position the light pipe 760 in the light pipe support 762. In the illustrated embodiment the light pipe assembly 761 includes three support members 764. In other embodiments, however, the light pipe assembly 764 can include more or less than three support members 764, including, for example, one, two, or four support members 764. The light pipe support 762 provides a stable attachment mechanism to secure the light pipe 760 to the body 703 of the imaging device 400 (FIG. 7B). For example, the light pipe support 762 can be coupled to the light pipe 761 via the support members 764, and the light pipe support 762 can be secured to the body 703 of the imaging device 400 with the light pipe securing clamp 762.

From the foregoing, it will be appreciated that specific embodiments of the disclosure have been described herein for purposes of illustration, but that various modifications may be made without deviating from the spirit and scope of the various embodiments of the disclosure. Further, while various advantages associated with certain embodiments of the disclosure have been described above in the context of those embodiments, other embodiments may also exhibit such advantages, and not all embodiments need necessarily exhibit such advantages to fall within the scope of the disclosure. Accordingly, the disclosure is not limited, except as by the appended claims.

We claim:

1. An imaging device, comprising:
   a lens configured to introduce light into the imaging device along an optical path;
   an image sensor spaced apart from the lens and configured to receive at least a portion of the light along the optical path;
   a filter assembly positioned between the lens and the image sensor, wherein the filter assembly comprises a filter wheel configured to rotate about a rotational axis that is generally parallel to the optical path; and
   a reflector carried by the filter assembly, wherein the filter assembly is configured to move the reflector between first and second positions, and wherein in the first position the reflector is at least partially aligned with the optical path and reflects at least a portion of the light toward an input different than the image sensor, and in the second position the reflector is positioned outside of the optical path.

2. The imaging device of claim 1, further comprising a filter carried by the filter wheel, wherein the filter wheel is configured to move the filter between filtering and non-filtering positions, wherein in the filtering position the filter is at least partially aligned with the optical path and filters at least a portion of the light, and in the non-filtering position the filter is positioned out of alignment with the optical path.

3. The imaging device of claim 2 wherein the reflector is in the second position when the filter is in the filtering position.

4. The imaging device of claim 1, wherein the input different than the image sensor comprises an optical input configured to collect at least a portion of the light reflected by the reflector when the reflector is in the first position, and wherein the optical input is configured to transmit the reflected light to a spectrometer.

5. The imaging device of claim 4 wherein the optical input is a light pipe.

6. The imaging device of claim 4 wherein the optical input is an optical fiber.

7. The imaging device of claim 1 wherein the reflector comprises a continuous surface mirror.

8. The imaging device of claim 1 wherein the reflector comprises a Fresnel mirror.

9. The imaging device of claim 1 wherein the reflector comprises a diffuser.

10. The imaging device of claim 1 wherein the filter assembly has a thickness, and wherein the reflector fits within a thickness of the filter assembly.

11. The imaging device of claim 1 wherein the reflector is a first mirror, and wherein the imaging device further comprises a second mirror positioned outside of the optical path and a third mirror positioned outside of the optical path, wherein when the first mirror is in the first position the first mirror reflects at least a portion of the light to the second mirror, and the second mirror reflects at least a portion of the light to the third mirror.

12. The imaging device of claim 11 wherein each of the first, second, and third mirrors is independently adjustable within the imaging device.

13. A digital imaging system, comprising:
a digital camera including
  a body;
  a lens carried by the body, wherein the lens allows light to enter the body;
  an image sensor carried by the body, wherein the image sensor detects at least a portion of the light that enters the body;
  a filter wheel movably positioned in the body between the lens and the image sensor, wherein the filter wheel is configured to rotate within the body about a rotational axis that is generally parallel with an optical path of the light passing from the lens to the image sensor;
  a filter carried by the filter wheel;
  a reflector carried by the filter wheel, wherein the filter wheel is configured to selectively position one of the filter and the reflector between the lens and the image sensor; and
  an optical input configured to receive at least a portion of the light reflected from the reflector when the filter wheel positions the reflector between the lens and the image sensor; and
a spectrometer coupled to the optical input.

14. The system of claim 13 wherein the reflector is a first mirror, and wherein the system further comprises second and third mirrors carried by the body, and wherein when the first mirror is positioned between the lens and the imaging sensor the first mirror reflects light to the second mirror, the second mirror reflects light from the first mirror to the third mirror, and the third mirror reflects light from the second mirror to the optical input.

15. The system of claim 13 wherein the reflector is a mirror.

16. The system of claim 15 wherein the mirror is a Fresnel mirror.

17. The system of claim 13 wherein the spectrometer is integral with the digital camera.

18. A method of acquiring optical data with an imaging device having a filter assembly positioned along an optical axis between a lens and an imaging sensor, the method comprising:
  selectively moving the filter assembly to move a reflector carried by the filter assembly between a first position and a second position aligned with the optical axis extending between the lens and the imaging sensor, wherein selectively moving the filter assembly comprises rotating a filter wheel about a rotational axis that is generally parallel with the optical axis;
  reflecting at least a portion of light transmitted along the optical axis when the reflector is aligned with the optical axis; and
  collecting at least a portion of the reflected light with an optical input.

19. The method of claim 18, further comprising transmitting at least a portion of the reflected light from the optical input to a spectrometer.

20. The method of claim 18 wherein selectively moving the filter assembly to align the reflector with the optical axis comprises selectively moving the filter assembly to align a mirror with the optical axis.

21. The method of claim 18 wherein selectively moving the filter assembly to align the mirror with the optical axis comprises selectively moving the filter assembly to align a Fresnel mirror with the optical axis.

22. The method of claim 18 wherein the reflector is a first mirror, and wherein reflecting at least a portion of the light comprises:
  reflecting at least a portion of the light from the first mirror to a second mirror, and
  reflecting at least a portion of the light from the second mirror to a third mirror, wherein the second and third mirrors are not aligned with the optical axis.

23. The method of 18 further comprising selectively moving the filter assembly to align a filter with the optical axis, wherein the filter is aligned with the optical axis when the reflector is not aligned with the optical axis.

* * * * *